(12) United States Patent
Chang (10) Patent No.: US 8,654,247 B2
(45) Date of Patent: Feb. 18, 2014

(54) IMAGE-CAPTURING DEVICE AND ELECTRONIC EQUIPMENT HAVING THE SAME

(75) Inventor: Wen-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 277 days.

(21) Appl. No.: 13/166,354

(22) Filed: Jun. 22, 2011

(65) Prior Publication Data

US 2012/0127362 A1 May 24, 2012

(30) Foreign Application Priority Data

Nov. 18, 2010 (TW) ................................ 99139709 A (51) Int. Cl.
*H04N 5/225* (2006.01)
*H04N 5/222* (2006.01)

(52) U.S. Cl.
USPC ...................................... 348/373; 348/333.06

(58) Field of Classification Search
USPC ............ 348/207.1, 207.11, 333.06, 373, 375, 348/376
See application file for complete search history.

(56) References Cited

U.S. PATENT DOCUMENTS

| | | | | |
|---|---|---|---|---|
| 7,272,423 B2 * | 9/2007 | Satoh et al. | ................. | 455/575.3 |
| 7,286,181 B2 * | 10/2007 | Cha | ................. | 348/373 |
| 7,570,485 B2 * | 8/2009 | Krah | ................. | 361/679.23 |
| 7,800,648 B2 * | 9/2010 | Lu et al. | ................. | 348/207.1 |
| 2005/0168924 A1 * | 8/2005 | Wu et al. | ................. | 361/683 |
| 2005/0231578 A1 * | 10/2005 | Tajima | ................. | 347/104 |
| 2006/0113173 A1 | 6/2006 | Matsumoto et al. | | |

FOREIGN PATENT DOCUMENTS

| | | |
|---|---|---|
| CN | 2630898 | 8/2004 |
| CN | 2650173 | 10/2004 |
| CN | 2672692 | 1/2005 |
| CN | 2814461 | 9/2006 |
| CN | 2874554 | 2/2007 |
| CN | 101140008 | 3/2008 |

OTHER PUBLICATIONS

Office action dated Sep. 11, 2013 from corresponding Chinese Patent Application No. 201010563376.5 and its English summary provided by the clients.

* cited by examiner

*Primary Examiner* — Trung Diep
(74) *Attorney, Agent, or Firm* — Ladas & Parry, LLP (57) ABSTRACT

An image-capturing device includes a fixing element, an image-capturing module, and a resilient friction element. The fixing element includes a fixed friction face. The image-capturing module includes a journal portion connected rotatably to the fixing element, and a main body connected to the journal portion and having a lens. The journal portion has an outer surface facing the friction face and rotatable relative to the friction face, and at least one accommodating groove formed in the outer surface. The resilient friction element is disposed on the outer surface of the journal portion, and includes at least one friction portion spanning the accommodating groove. The friction portion is in frictional contact with the friction face, and is deformed and compressed into the accommodating groove by the friction face.

16 Claims, 7 Drawing Sheets

IMAGE-CAPTURING DEVICE AND ELECTRONIC EQUIPMENT HAVING THE SAME

CROSS-REFERENCE TO RELATED APPLICATIONS

This application claims priority of Taiwanese Patent Application No. 099139709 filed on Nov. 18, 2010, the disclosures of which is incorporated herein by reference.

BACKGROUND OF THE INVENTION

1. Field of the Invention

This invention relates to an image-capturing device, and more particularly to an image-capturing device that can be positioned at a selected angular position through frictional contact between a resilient friction element and a fixing element and an electronic equipment having the image-capturing device.

2. Description of the Related Art

A conventional notebook computer having an image-capturing or photo-taking function generally has an image-capturing device provided in a fixed or rotatable manner. A rotatable image-capturing device is connected to a display screen housing through a rotary shaft, a gear wheel and rack assembly, and/or a motor, so that the image-capturing device can rotate relative to the display screen housing to a desired angular position.

However, if the rotary shaft is used to connect the image-capturing device to the display screen housing, the torque value of the rotary shaft must be calculated to conform with an applied force of a user to rotate the image-capturing device and to fix the same at a selected angular position. If the gear wheel and rack assembly is used, the gear ratio may need to be calculated and considered. And, if the motor is used, an additional drive circuit may need to be designed to drive rotation of the motor. Use of any of the aforesaid methods may result in excessive research time, and/or each of the aforesaid structural designs may be complicated, which can increase assembly time and associated production costs. Therefore, the area of improvement that the present invention focuses on is that related to realizing an image-capturing device that has a simple structure and that can be positioned at a selected angular position.

SUMMARY OF THE INVENTION

A main object of the present invention is to provide an image-capturing device that can be positioned at a selected angular position through frictional contact between a resilient friction element and a fixing element and that has a simple structure to minimize the assembly time and the production costs thereof.

Another object of the present invention is to provide an electronic equipment having an image-capturing device that can be positioned at a selected angular position through frictional contact between a resilient friction element and a fixing element and that has a simple structure to minimize the assembly time and the production costs thereof.

The purpose of the present invention and the solution to the conventional technical problems are achieved through employment of the below technical means. According to one aspect of disclosure of the present invention, an image-capturing device comprises a fixing element including a fixed friction face, an image-capturing module, and a resilient friction element. The image-capturing module includes a journal portion connected rotatably to the fixing element, and a main body connected to the journal portion and having a lens. The journal portion has an outer surface facing the friction face and rotatable relative to the friction face, and at least one accommodating groove formed in the outer surface. The resilient friction element is disposed on the outer surface of the journal portion, and includes at least one friction portion spanning the accommodating groove. The friction portion is in frictional contact with the friction face, and is deformed and compressed into the accommodating groove by the friction face.

According to another aspect of disclosure of the present invention, an electronic equipment having an image-capturing device comprises a housing and an image-capturing device. The image-capturing device includes a fixing element fixed to the housing and including a friction face, an image-capturing module, and a resilient friction element. The image-capturing module includes a journal portion connected rotatably to the fixing element, and a main body connected to the journal portion and having a lens. The journal portion has an outer surface facing the friction face and rotatable relative to the friction face, and at least one accommodating groove formed in the outer surface. The resilient friction element is disposed on the outer surface of the journal portion, and includes at least one friction portion spanning the accommodating groove. The friction portion is in frictional contact with the frintion face, and is deformed and compressed into the accommodating groove by the friction face.

Through the aforesaid technical means, the advantages and effectiveness of the electronic equipment having an image-capturing device according to the present invention include the use of interference friction between the friction portion of the resilient friction element and the friction face of the fixing element to position the lens of the image-capturing module at a selected angular position. Further, because the image-capturing device has few components and a simple structure, the assembly time and the production costs thereof can be greatly reduced.

BRIEF DESCRIPTION OF THE DRAWINGS

Other features and advantages of the present invention will become apparent in the following detailed description of the embodiments of the invention, with reference to the accompanying drawings, in which.

DETAILED DESCRIPTION OF THE PREFERRED EMBODIMENTS

The above-mentioned and other technical contents, features, and effects of this invention will be clearly presented from the following detailed description of the two embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Referring to FIGS. 1 to 6, an electronic equipment 100 according to the first embodiment of the present invention comprises a housing 10 and an image-capturing device 20. The image-capturing device 20 is disposed in a receiving groove 11 of the housing 10. In this embodiment, the electronic equipment 100 is exemplified as a notebook computer. Alternatively, the electronic equipment 100 may be a mobile phone, a personal digital assistant (PDA), or a tablet computer.

Figure 1:
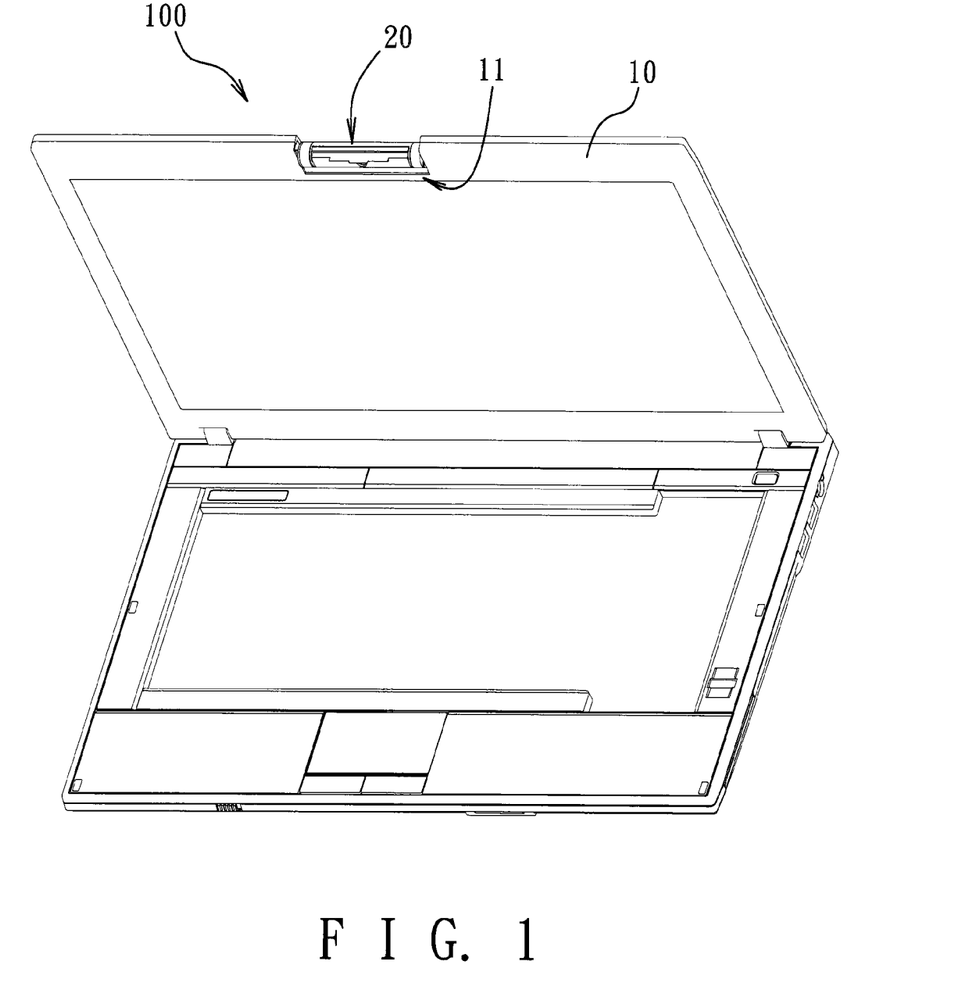
FIG. 1 is a perspective view of an electronic equipment having an image-capturing device according to the first embodiment of the present invention.
Figure 2:
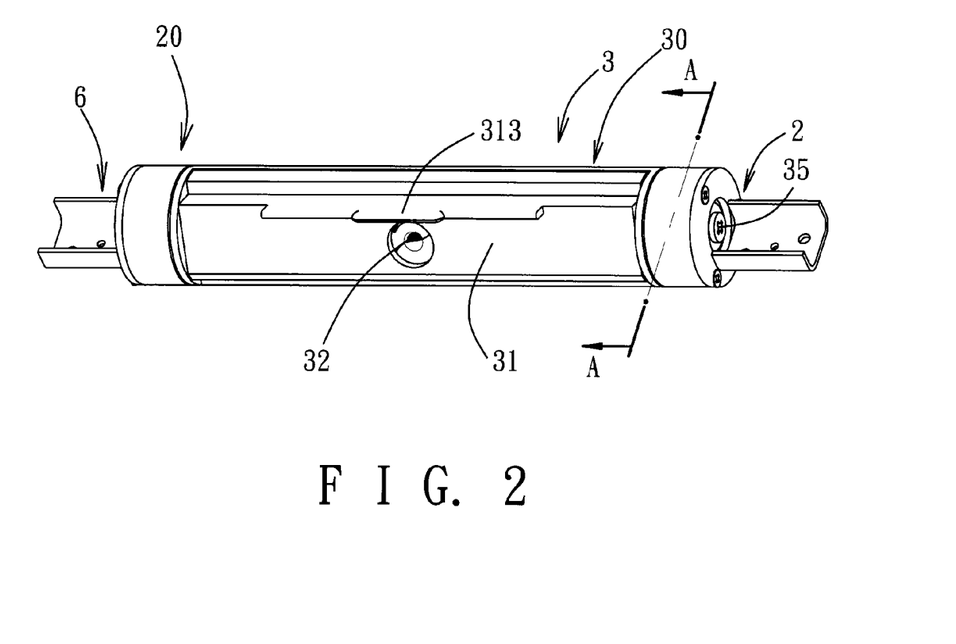
FIG. 2 is an enlarged perspective view of the image-capturing device of the first embodiment.
Figure 3:
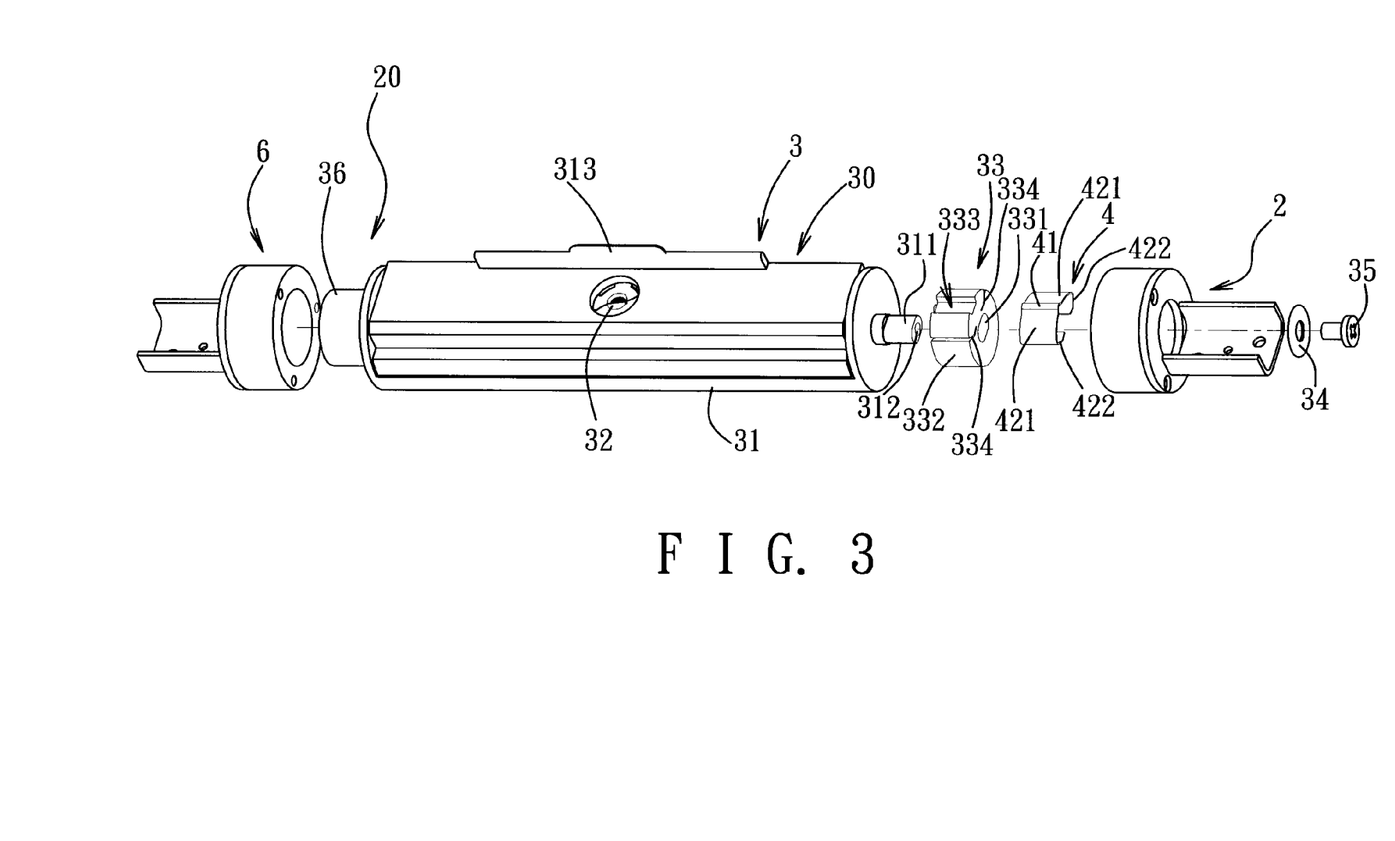
FIG. 3 is an exploded perspective view of the image-capturing device of FIG. 2.
Figure 4:
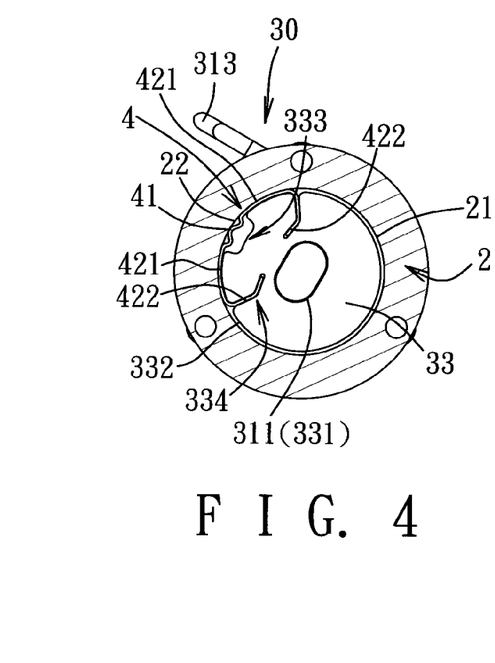
FIG. 4 is a sectional view of the first embodiment taken along line A-A of FIG. 2.

With reference to FIGS. 2, 3, and 4, the image-capturing device 20 includes two fixing elements 2, 6 and an image-capturing module 3. Each fixing element 2 may be fixed to the housing 10 (see FIG. 1) within the receiving groove through a suitable fastening method, such as a screw-fastening method. The image-capturing module 3 has a rotating element 30 including two journal portions 33, 36, and a main body 31 connected between the journal portions 33, 36 and having a lens 32.

To achieve a positioning effect of the image-capturing module 3 at a selected angular position during rotation relative to the fixing elements 2, a description of the structural design of the embodiment is provided below.

The fixing element 2 includes a friction face 22. The friction face 22 is annular, and defines a connecting hole 21. In this embodiment, the friction face 22 is circular.

The journal portion 33 is connected rotatably to the fixing element 2, and has an outer surface 332 facing the friction face 22 and rotatable relative to the friction face 22, and an accommodating groove 333 formed in the outer surface 332. The outer surface 332 is annular. The journal portion 33 has an outer diameter smaller than a diameter of the connecting hole 21, so that the journal portion 33 can be connected rotatably to the connecting hole 21. The journal portion 33 further has a non-circular through hole 331 which has a shape similar to a non-circular shaft 311 of the main body 31 to permit extension of the shaft 311 therethrough. Through such a configuration, the journal portion 33 can be fitted around the non-circular shaft 311 and will not rotate relative to the main body 31. Further, the image-capturing module 3 further includes a washer 34 abutting against an outer end of the journal portion 33, and a screw 35 that extends through the washer 34 and the non-circular through hole 331 to engage a screw hole 312 in the shaft 311. With the screw 35 abutting against an outer end of the washer 34, the journal portion 33 can be fixed to and will not be easily separated from the shaft 311 of the main body 31. It should be noted that although the journal portion 33 in this embodiment is fixed to the main body 31 through the screw 35, in an alternative embodiment, the journal portion 33 may be formed integrally as one piece with the main body 31, and is not limited to the aforesaid disclosures.

The journal portion 36 is connected rotatably to the fixing element 6. As shown in FIG. 3, the journal portion 36 has a cylindrical shape. Alternatively, the journal portion 36 may have a structure similar to that of the journal portion 33.

The rotating element 30 further includes an operating tab 313 projecting outwardly from a central part of the main body 31.

A resilient friction element 4 is disposed around the outer surface 332 of one of the journal portions 33. The resilient friction element 4 is made of a resilient metallic material, and includes a friction portion 41 corresponding in position to and spanning the accommodating groove 333. The friction portion 41 is in frictional contact with the friction face 22 of the fixing element 2. Since the friction portion 41 is a curvedly bent part that projects toward the friction face 22, when the journal portion 33 and the friction element 4 are simultaneously inserted into the connecting hole 21 in the fixing element 2, the friction portion 41 and the friction face 22 will interfere with each other, and the friction portion 41 is deformed and compressed into the accommodating groove 333 by the friction face 22. Through the frictional contact between the friction portion 41 and the friction face 22, the image-capturing module 3 can be positioned at any selected angular position and will not rotate relative to the fixing element 2.

Another resilient friction element (not shown) may be disposed around the outer surface 332 of the journal portion 36 to further stabilize positioning of the image-capturing module 3 at any selected angular position.

The journal portion 33 further includes two fixing slots 334 formed in the outer surface 332 on two opposite sides of the accommodating groove 333, respectively. The resilient friction element 4 further includes two insert portions 422 formed respectively on two opposite sides of the friction portion 41 and fitted respectively in the fixing slots 334, and two connecting portions 421 each connected between one of the insert portions 422 and the friction portion 41 and in contact with the outer surface 332. Each insert portion 422 is bent from one of the connecting portions 421 into a respective fixing slot 334. Through this configuration, the friction element 4 can be fixed to the journal portion 33. Further, the two connecting portions 421 can provide supporting forces to the friction portion 41 so that the protruding curved shape of the friction portion 41 can be maintained and can correspond in position to the accommodating groove 333.

Figure 5:
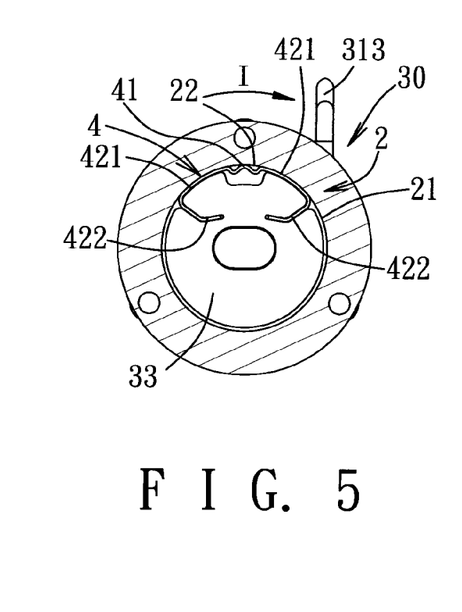
FIG. 5 is a view similar to FIG. 4, but an operating tab in another position.
Figure 6:
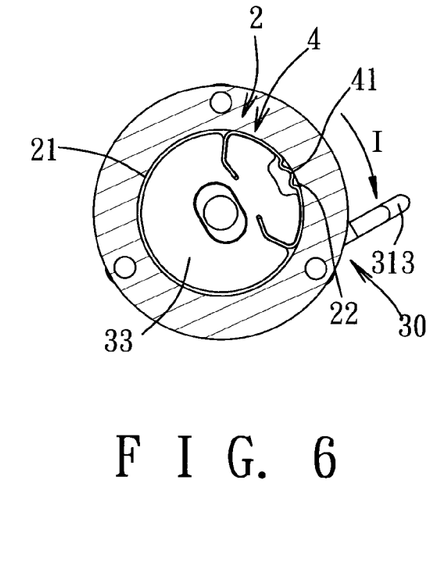
FIG. 6 is a view similar to FIG. 4, but illustrating the operating tab in a still another position.

With reference to FIGS. 4 to 6, an external force is applied to the operating tab 313 in the direction of an arrow (I) to adjust an angular position of the lens 32 (see FIG. 2) of the image-capturing module 3. The external force is larger than a frictional force of the friction portion 41 and the friction face 22 so as to rotate the journal portion 33 relative to the fixing element 2. When the lens 32 is rotated to a selected angular position, the operating tab 313 is released, and the lens 32 is positioned at the selected angular position (see FIGS. 5 and 6) through interference friction between the friction portion 41 of the resilient friction element 4 and the friction face 22 of the fixing element 2.

Figure 7:
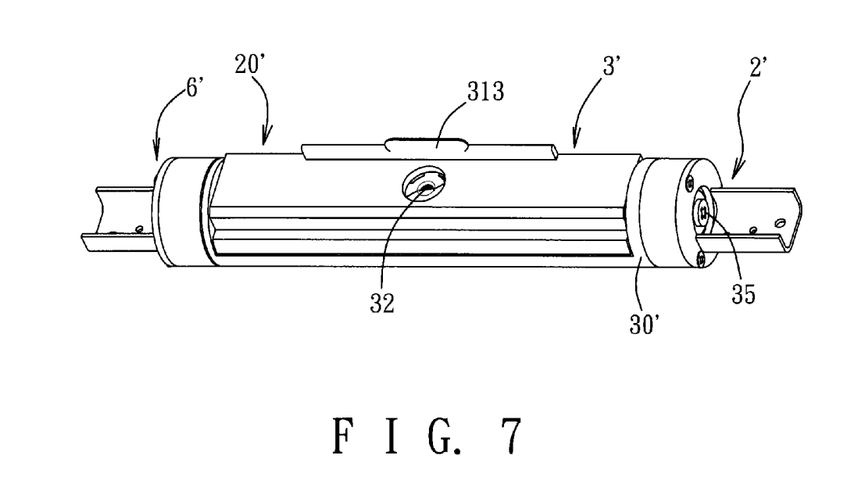
FIG. 7 is an enlarged perspective view of an image-capturing device of an electronic equipment according to the second embodiment of the present invention.
Figure 8:
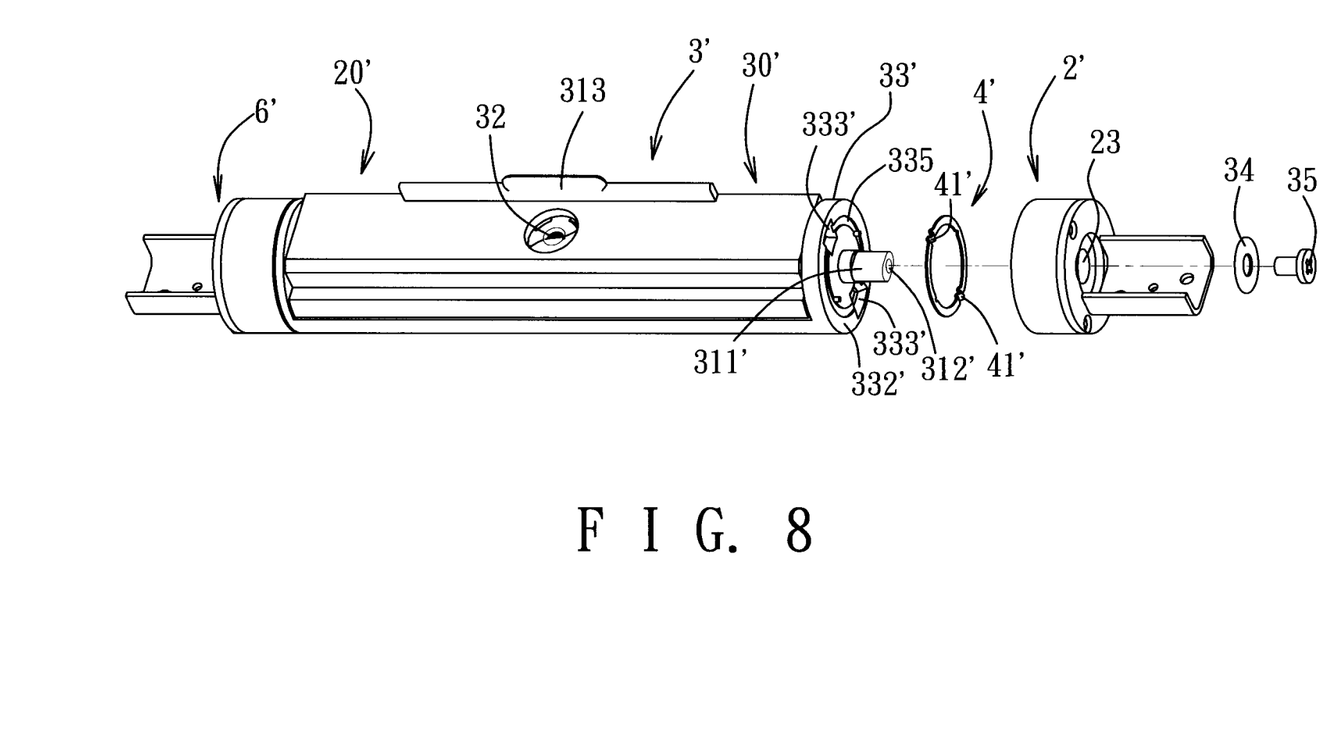
FIG. 8 is an exploded perspective view of the image-capturing device of FIG. 7.
Figure 9:
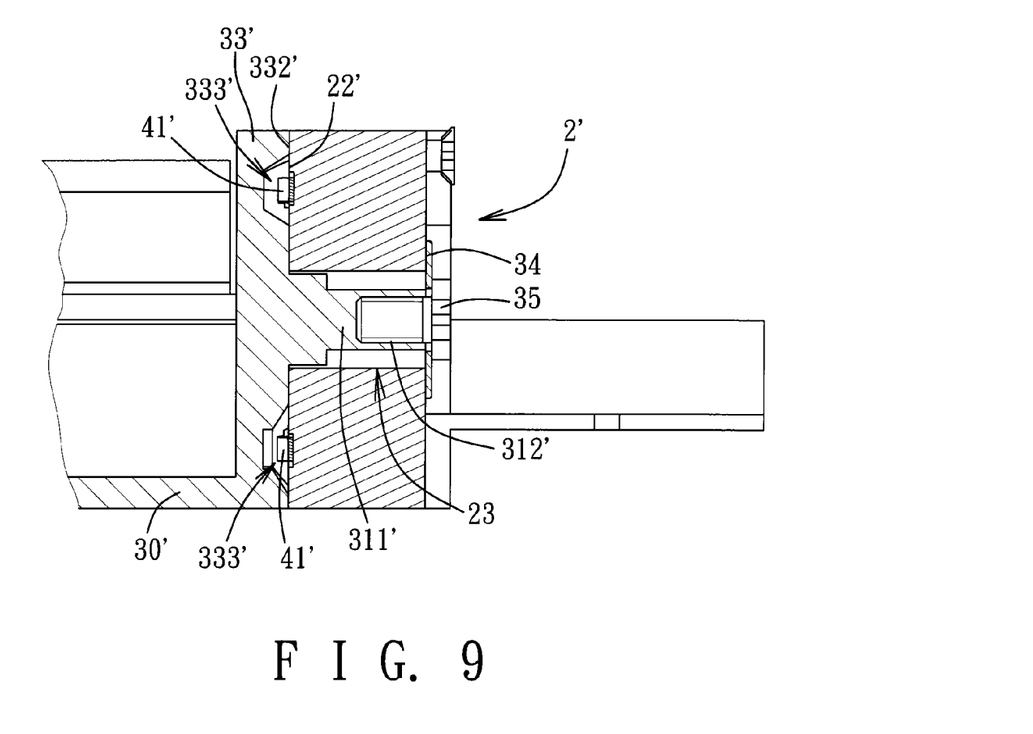
FIG. 9 is a fragmentary sectional view of the image-capturing device of the second embodiment.

Referring to FIGS. 7 to 9, an electronic equipment 100 according to the second embodiment of the present invention is shown to be similar to the first embodiment. The difference between the first and second embodiments resides in the construction of the image-capturing device 20'. In this embodiment, the friction face 22' of the fixing element 2' and the outer surface 332' of the journal portion 33' of the rotating element 30' of the image-capturing module 3' are formed as flat radial surfaces that contact each other. The fixing element 2' further includes a journal hole 23. The shaft 311' projects from the outer surface 332' into the journal hole 23. The washer 34 abuts against the fixing element 2. The screw 35 extends through the washer 34, and engages the screw hole 312' in the shaft 311', thereby connecting the journal portion 33' to the fixing element 2'.

The journal portion 33' includes two accommodating grooves 333' formed in the outer surface 332' and diametrically opposite to each other, and an annular recess 335 formed in the outer surface 332' and extending through the accommodating grooves 333'. The resilient friction element 4' is formed as a ring fitted in the annular recess 335, and includes two diametrically opposed friction portions 41' formed on the ring and spanning the accommodating grooves 333', respectively. The friction portions 41' are in frictional contact with the friction face 22'. Through the interference friction between the two friction portions 41' and the friction face 22', contact area between the resilient friction element 4' and the friction face 22' can be enhanced to stably position the lens 32 of the image-capturing module 3' at a selected angular position. Alternatively, there may be one accommodating groove 333' and one friction portion 41'. The purpose of positioning stably the lens 32 of the image-capturing module 3' at the selected angular position can be similarly achieved.

From the aforesaid description, the electronic equipment 100 of each embodiment makes use of the interference friction between the friction portion 41, 41' and the friction face 22, 22' to position the lens 32 at a selected angular position. Further, because the image-capturing device 20, 20' has few assembling components and a simple structure, the assembly time and manufacturing costs thereof can be greatly minimized. Hence, the object of the present invention can be realized.

While the present invention has been described in connection with what are considered the most practical and embodiments, it is understood that this invention is not limited to the disclosed embodiments but is intended to cover various arrangements included within the spirit and scope of the broadest interpretations and equivalent arrangements.

I claim:

1. An image-capturing device comprising:
a fixing element including a fixed friction face;
an image-capturing module including a journal portion connected rotatably to said fixing element, and a main body connected to said journal portion and having a lens, said journal portion having an outer surface facing said friction face and rotatable relative to said friction face, and at least one accommodating groove formed in said outer surface; and
a resilient friction element disposed on said outer surface of said journal portion and including at least one friction portion spanning said accommodating groove, said friction portion being in frictional contact with said friction face and being deformed and compressed into said accommodating groove by said friction face.

2. The image-capturing device of claim 1, wherein said friction portion is a curvedly bent part that projects toward said friction face.

3. The image-capturing device of claim 2, wherein said friction face is annular, and defines a connecting hole, said journal portion being connected rotatably to said connecting hole, said outer surface being annular, said resilient friction element being disposed around said outer surface.

4. The image-capturing device of claim 3, wherein said journal portion further has two fixing slots formed in said outer surface on two opposite sides of said accommodating groove, respectively, said resilient friction element further including two insert portions formed respectively on two opposite sides of said friction portion and fitted respectively in said fixing slots.

5. The image-capturing device of claim 4, wherein said resilient friction element further includes two connecting portions each connected between one of said insert portions and said friction portion and in contact with said outer surface, each of said insert portions being bent from one of said connecting portions into a respective one of said fixing slots.

6. The image-capturing device of claim 2, wherein said friction face and said outer face are formed as flat radial surfaces that contact each other, said journal portion further having a shaft projecting from said outer surface and journaled to said fixing element, and an annular recess formed in said outer surface and extending through said accommodating groove, said resilient friction element being formed as a ring fitted in said annular recess, said friction portion being formed on said ring.

7. The image-capturing device of claim 2, wherein said friction face and said outer face are formed as flat radial surfaces that contact each other, said journal portion having two said accommodating grooves that are diametrically opposite to each other, said journal portion further having an annular recess formed in said outer surface and extending through said accommodating grooves, said resilient friction element being formed as a ring fitted in said annular recess, said resilient friction element including two said friction portions formed on said ring and spanning said accommodating grooves, respectively.

8. The image-capturing device of claim 1, further comprising an operating tab projecting outwardly from said main body.

9. An electronic equipment having an image-capturing device, comprising:
a housing; and
an image-capturing device including
a fixing element fixed to said housing and including a friction face,
an image-capturing module including a journal portion connected rotatably to said fixing element, and a main body connected to said journal portion and having a lens, said journal portion having an outer surface facing said friction face and rotatable relative to said friction face, and at least one accommodating groove formed in said outer surface; and
a resilient friction element disposed on said outer surface of said journal portion and including at least one friction portion spanning said accommodating groove, said friction portion being in frictional contact with said friction face and being deformed and compressed into said accommodating groove by said friction face.

10. The electronic equipment of claim 9, wherein said friction portion is a curvedly bent part that projects toward said friction face.

11. The electronic equipment of claim 10, wherein said friction face is annular, and defines a connecting hole, said journal portion being connected rotatably to said connecting hole, said outer surface being annular, said resilient friction element being disposed around said outer surface.

12. The electronic equipment of claim 11, wherein said journal portion further has two fixing slots formed in said outer surface on two opposite sides of said accommodating groove, respectively, said resilient friction element further including two insert portions formed respectively on two opposite sides of said friction portion and fitted respectively in said fixing slots.

13. The electronic equipment of claim 12, wherein said resilient friction element further includes two connecting portions each connected between one of said insert portions and said friction portion and in contact with said outer surface, each of said insert portions being bent from one of said connecting portions into a respective one of said fixing slots.

14. The electronic equipment of claim 10, wherein said friction face and said outer face are formed as flat radial surfaces that contact each other, said journal portion further having a shaft projecting from said outer surface and journaled to said fixing element, and an annular recess formed in said outer surface and extending through said accommodating groove, said resilient friction element being formed as a ring fitted in said annular recess, said friction portion being formed on said ring.

15. The electronic equipment of claim 10, wherein said friction face and said outer face are formed as flat radial surfaces that contact each other, said journal portion having two said accommodating grooves that are diametrically opposite to each other, said journal portion further having an annular recess formed in said outer surface and extending through said accommodating grooves, said resilient friction element being formed as a ring fitted in said annular recess, said resilient friction element including two said friction portions formed on said ring and spanning said accommodating grooves, respectively.

16. The electronic equipment of claim 9, further comprising an operating tab projecting outwardly from said main body.

\* \* \* \* \*